United States Patent [19]

McPhee

[11] 4,036,343
[45] July 19, 1977

[54] FAIL SAFE PRESS BRAKE GUARD

[75] Inventor: John McPhee, Scarborough, Canada

[73] Assignee: Rusco Industries, Inc., Los Angeles, Calif.

[21] Appl. No.: 609,023

[22] Filed: Aug. 29, 1975

[51] Int. Cl.$^2$ .............................................. F16D 9/00
[52] U.S. Cl. .................................. 192/134; 192/129; 192/130 B; 100/51
[58] Field of Search ............... 192/134, 129, 133, 130; 100/51

[56] References Cited

U.S. PATENT DOCUMENTS

| | | | |
|---|---|---|---|
| 2,030,976 | 2/1936 | Fairfield et al. | 192/134 |
| 2,683,515 | 7/1954 | Hoan et al. | 192/134 |
| 2,888,123 | 5/1959 | Madden | 192/134 |
| 3,213,992 | 10/1965 | Gustafson et al. | 192/134 |
| 3,276,557 | 10/1966 | Brown | 192/130 |
| 3,300,009 | 1/1967 | Hess | 192/130 |

Primary Examiner—Samuel Scott
Assistant Examiner—Randall Heald
Attorney, Agent, or Firm—Oldham & Oldham Co.

[57] ABSTRACT

The press brake safety device includes a vertically movable guard for moving in advance of the press brake ram, a lightweight protector bar movably positioned on the lower edge of the guard for vertical upward movement and means operably connecting an actuation means for the ram to the ram drive means to control ram actuation. Air operated means connect to these ram drive means to render the same inoperable, and air operated control means connect the protector bar and the air operated means to actuate such last named means when the protector bar is moved upwardly in relation to the guard as the guard is being moved downwardly by actuation of the press brake for work engaging action.

7 Claims, 8 Drawing Figures

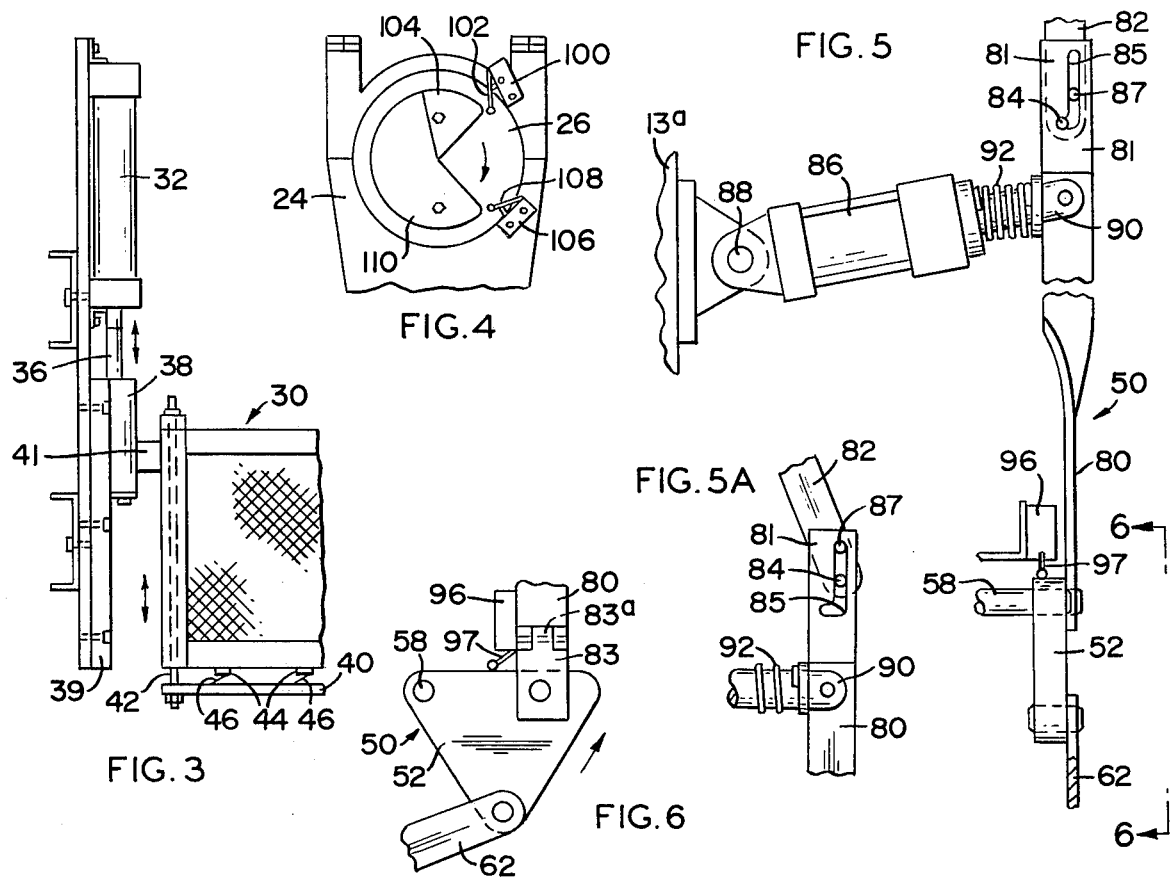
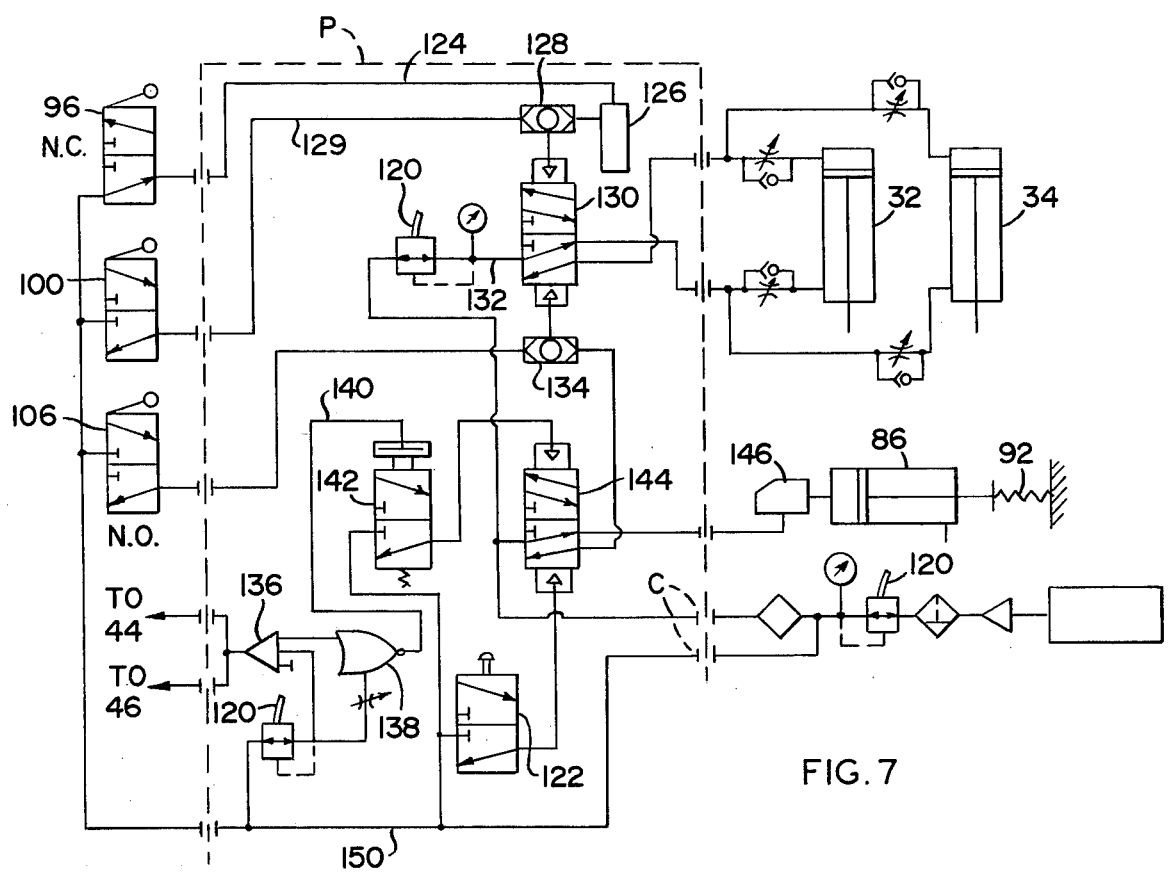

FAIL SAFE PRESS BRAKE GUARD

BACKGROUND OF INVENTION

Heretofore there have been many different types of safety means provided for press brakes. A number of these systems involve complicated electronic control circuits usually controlling both electrical and pneumatic control apparatus therein, examples of which structures are shown in U.S. Pats. Nos. 3,534,844 and 3,554,067. One relatively uncomplicated pneumatic control system for positioning a guard in operative position in a pressing apparatus and which insures that the guard is in guarding position before press closing action occurs, is shown in U.S. Pat. No. 2,888,123 while another relatively simple safety guard apparatus and control means is shown in U.S. Pat. No. 3,213,992. While these previously known types of press brake guards and other varieties of the same have been proposed heretofore, all of such controls are relatively complex, difficult to install on existing machinery, or they may not be absolutely positive in acting under all operative conditions.

The general object of the present invenition is to provide relatively uncomplicated fail safe guard control means for use with a mechanically driven press brake.

Another object of the inventon is to provide a press brake guard apparatus and control system especially adapted for use with mechanically operated and driven press brakes and to provide a positive acting mechanical safety control in the press brake drive means.

Yet another object of the invention is to provide an air pressure control system for a guard used with a press brake; to stop brake operation if an obstruction is present in the ram path; and to insure that the press brake cannot be operated when air pressure supply thereto terminates.

Yet other objects of the invention are to provide apparatus of the type described and wherein control means are present for automatically setting the guard in a safe position if the machine or brake is recycled without removing one's foot from the foot treadle; to use a lightweight supplemental bar on the guard to signal contact with an obstruction as the guard moves downwardly; another object is to terminate press brake action rapidly should any obstruction be contacted by the guard member when moving down into operative guard position; to use substantially commercial components in an air pressure control system for a press brake guard; and, to provide a press brake guard applicable to existing machinery with a minimum of changes thereto.

The foregoing and other objects and advantages of the invention will be made more apparent as the specification proceeds.

Reference now is particularly made to the accompanying drawings, wherein:

FIG. 3 is a fragmentary enlarged elevation of the guard mechanism and control cylinders therefor;

FIG. 4 is a fragmentary enlarged elevation of the eccentric, pitman and control cams and valves associated therewith;

FIG. 5 is a fragmentary enlarged view of a portion of the drive control means of the apparatus of FIG. 2;

FIG. 5a is a fragmentary view of a part of the drive control means when inoperatively positioned;

FIG. 6 is a fragmentary side elevation taken on line 6—6 of FIG. 5; and

FIG. 7 is a flow control diagrammatic view of the air pressure control system of the invention.

When referring to corresponding members shown in the drawings and described in the specification, corresponding numerals are used to facilitate comparison therebetween.

SUBJECT MATTER OF INVENTION

Figure 1:
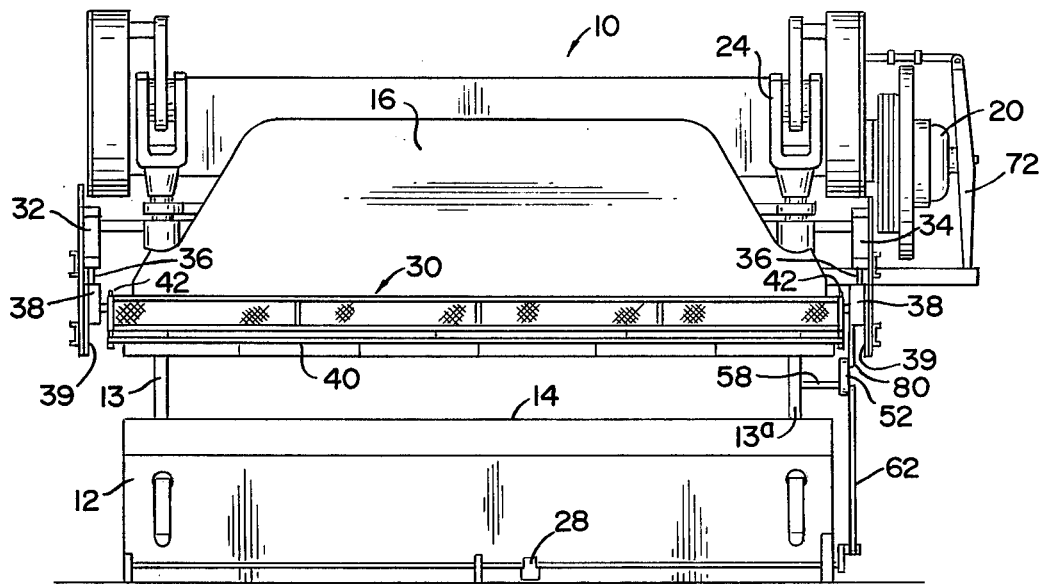
FIG. 1 is a front elevation of a press brake embodying the principles of the invention.

This invention relates to a press brake safety device for a mechanically driven press brake, including a frame having a work positioning means thereon, a ram positioned for vertical movement towards and away from engaging work at the work positioning means, drive means for the ram, and a foot treadle for controlling actuation of the ram for work engaging movement, the invention relating to the improvement comprising a guard, cylinders engaging said guard to move it vertically ahead of the ram down to and back from a position shielding a work positioning means, a lightweight protector bar movably positioned on the lower end of the guard for vertical upward movement, means operably connecting the foot treadle to the drive means to control ram actuation by movement of the foot treadle, air operated means operably connecting to the last-named means for rendering the same inoperable, and air operated control means operably connecting to said protector bar and the air operated means to actuate the last-named control means when the protector bar is moved upwardly in relation to the guard when the guard is being moved downwardly.

Reference now is made to the details of the apparatus shown in the accompanying drawings, and a press brake as indicated as a whole by the numeral 10. The press brake 10 includes a frame 12 having a work positioning means or a seat 14 provided thereon, and a ram 16 operably positioned on the frame 12 above such work positioning means 14 for power stroke or movement of the ram 16 down into engagement with a work piece on the seat 14 to shape or work the same and then move the ram 16 upwardly of the frame to inoperative position. Such drive means may include a motor (not shown) connected to the ram by a clutch 20. A brake means 22 is present in the apparatus and is operably connected to the drive motor and the clutch in a conventional manner. The actual drive means for the ram includes a pitman 24 and an eccentric 26. The ram 16 and press brake 10 are controlled in a conventional manner which comprises a foot treadly 28 pivotally carried on the frame 12 and operably connected to the ram drive means for triggering an operative cycle of the press brake when the treadly is depressed.

The present invention particularly relates to the safety devices provided in association with the press brake to prevent injury to a worker operating the press brake and to avoid any accident to such worker. The safety device includes a guard or guard means 30 of any conventional type and it comprises an elongate rectangular structure extending across the frame 12 in the opening formed between side plates 13 and 13a of the frame and below the ram 16 when elevated. The guard 30 is above the work positioning seat 14. The guard is secured at its ends to a pair of vertical control cylinders 32 and 34 positioned on opposed lateral marginal areas of the frame 12 and with such cylinders having piston rods 36 extending therefrom and being secured to opposed end portions of the guard 30. The guard 30 is adapted to be lowered and raised in a vertical plane parallel to the plane of movement for the ram, but in front of the same. The drive means for the cylinders 32 and 34 are correlated with the actuating means controlled by the treadle 28 so that the guard 30 is moved downwardly with and normally ahead of or below the ram 16 so that the guard will provide its protective function in the usual manner.

As a further feature of the pesent invention, the guard 30 has a lightweight protector bar 40 positioned therebelow extending the length thereof, and spaced slightly therefrom. Such protector bar 40 is slidably mounted on the guard 30 as by vertically extending support rods 42 fixed to ends of the bar 40 and slidably engaging the guard frame or brackets secured thereto whereby the support rods 42 can move a short distance vertically upwardly with relation to the guard when and if the protector bar 40 strikes any foreign object or other article in the path of movement of the guard 30.

The piston rods 36 of the cylinders 32 and 34 normally engage means such as slide blocks 38 operably engaging with conventional guide means 39 on the frame 12. Thus, the slide blocks can be moved vertically by the control cylindres and such slide blocks connect to opposite ends of the guard 30 as by attaching brackets 41.

In order to provide a control signal should the position of the protector bar 30 be disturbed as the guard assembly is being moved downwardly, a plurality of sensor means, such as valves 44 are positioned on horizontally spaced portions of the lower edge of the guard 30 and with control whiskers or arms 46 pivotally and downwardly extending therefrom in the path of upward movement of the protector bar 40 so that such whisker bars are moved immediately upon any displacement movement of the protector bar 40 in relation to the guard. As hereinafter described, this can change the setting in the valves 44 for desired control functions to terminate drive of the press brake.

Figure 2:
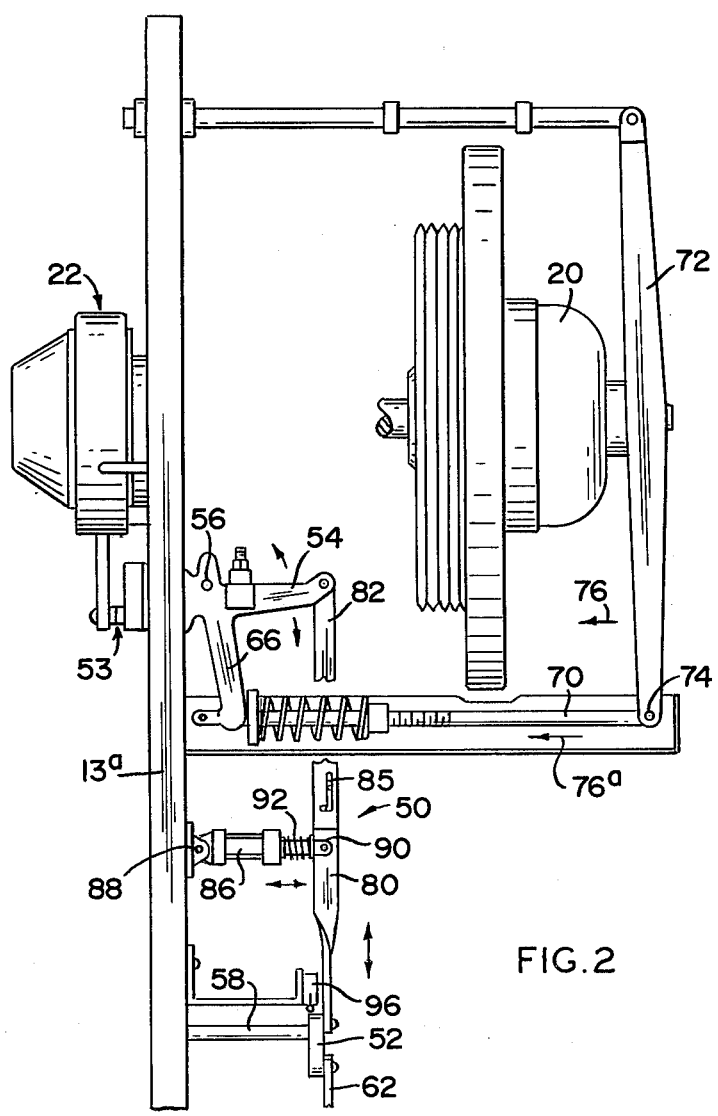
FIG. 2 is a fragmentary enlarged elevation, partially broken away, to show the clutch and foot treadle drive operative means of the press brake.

FIGS. 2, 5 and 6 of the drawings show a linkage means 50 which extends from a plate 52 that is pivotally positioned on the frame 12 up to a known control arm 54 that is pivotly positioned on a portion of the frame 12 at a pivot pin 56. The control plate 52 is directly actuated by the foot treadly 28 with the plate 52 being pivotally positioned on a support arm 58 or the like, carried by the frame, the treadly 28 operably connecting to this control plate 52 by suitable link 62 for pivotal movement thereof. The control arm or member 54 operably connects through means indicted at 53 to the brake 22 to release the same but with the control arm 54 having an extension 66 thereon that operably connects to a control rod or bar 70 that is conventinally positioned on the press frame 12 for axial movement. The rod 70 engages an end of a clutch control arm 72 at a pivotal connection 74 so that axial movement of the control rod 70 in the direction of the arrow 76 causes the clutch to be engaged whereby the mechanical drive provided by the drive motor is transmitted through the clutch when the brake 22 is released to cause an actuation cycle of the press brake.

An important feature of the present invention is that the linkage means 50 is not a unitary solid connector member as in a conventional drive means, but it comprises a lower link 80 that pivotally engages an upper link 82 by pin 84 with such pin extending through an L-shaped slot 85 formed in one arm of a bifurcated upper end 81 on the link 80 and being fixed to the lower end of the upper link 82 that is received between the ends of this link 80. The pin 84 seats in the foot of the slot 85 when the links 80 and 82 are coupled to control movement of the clutch control arm 54. A second guide pin 87 also engages the upper portion of the slot 85 to limit relative pivotal movement of the links 80 and 82. The lower link 80 also has a hinge end section 83 pivotally connected thereto which end section is secured to the control plate 52 so that the link 80 is free for slight movement toward and away from the adjacent portion of the press brake frame 12.

A control means, specifically air actuated cylinder 86, is pivotally connected at one end by pin 88 to a bracket means carried on the frame 12 to be positioned for pivotal movement in relation thereto. A piston rod 90 controlled by the cylinder 86 extends therefrom and it pivotally engages an upper end portion of the lower link 80 to be secured thereto. A coil spring 92 extends between an end of the cylinder 86 and the adjacent link 80 and normally urges it at its pivotal joint with the link 82 away from the adjacent portion of the frame 12. But, when the air cylinder 86 is powered by air supply thereto, it holds the linkage members 80 and 82 in fixed relationship to each other, FIG. 5, for actuating of the link 50 and clutch control 54 in the manner hereinbefore described. Upon release of the cylinder 86, the spring 92 forces the link members 80 and 82 out of straight line relation is indicated in FIG. 5a, and this prevents actuation movement of the control arm 54. Hence, the clutch arm 70 is not moved to cause brake release and clutch engagement as described hereinbefore.

Yet other air control valve means are provided at other portions of the press brake to insure safe operation of the same. Thus, a control or trip valve 96 is shown in FIGS. 5 and 6 positioned on the frame adjacent the control plate and having an operating finger or lever 97 extending therefrom and engaging the control plate 52. Thus, on pivotal movement of such control plate, the finger 97 is moved to cause the normally closed valve 96 to be opened as hereinafter described in more detail. Yet two other control valves are provided in the air operated control circuit of the invention and thus an override valve 100 having an operative control arm 102 extending therefrom is positioned on the pitman 24 and engages an operator or control cam 104 comprising an operative plate secured to the eccentric 26. Thus, when the control arm 102 is actuated by the cam plate 104, such cam follower or valve actuater arm 102 causes the valve 100 which is normally open to be closed for control functions as hereinafter described. Yet an additional control or return valve 106 is mounted on the pitman and has an arm 108 extending therefrom for engaging a cam plate 110 on the eccentric so that with rotation of such eccentric on operative movement of the ram, the valve 106 which is normally open is closed by the cam plate and signals to a valve means in the control circuit to actuate the cylinders 32 and 34 for return of the guard 30 to its uppermost position.

OPERATIVE AIR CONTROL SYSTEM

FIG. 7 shows diagrammatically the members composing the pneumatic fail safe control system of the invention and it indicates air supply lines 120 that connect to a suitable source of compressed air (not shown). A push button control means or valve 122 is suitably mounted on the press 10 or a control panel and by compressing the same, it supplies air pressure to the system for operation thereof. At this time, the foot operated treadle 28 should be in its elevated position. Then, by stepping on the treadle, the normally closed valve 96 is opened and it connects by a line 124 to a pulse valve 126 which in turn changes the position of a shuttle valve 128 to which such pulse valve 126 connects. The shuttle valve 128 connects to and actuates a valve 130 to change it from the position shown over to its alternate position wherein air pressure from line 132 is transmitted to the cylinders 32 and 34 to extend the same and cause the guard to be moved downwardly. Normally, pressure on the valve 130 causes the cylinders 32 and 34 to retract their piston rods and raise the guard 30.

If for some reason the foot operated trip valve 96 fails to function, then override valve 100, normally open, will be closed by the cam 104 on the eccentric, contacting such valve to close the same, which action occurs as the ram is started to move downward. When such valve 100 is closed, it signals or supplies air directly to the shuttle valve 128 by line 129 to valve 130 to change from its normal position, as shown, to cause the cylinders 32 and 34 to be supplied with air pressure in an opposite manner to extend the piston rods thereof and hence move the guards downwardly.

The valve 106 is a return valve and it is normally open but is closed by the cam 110 on the eccentric when the ram 16 has moved down to actuate shuttle valve 134 and return the control valve 130 to its other position at which time pressure is supplied to the cylinders 32 and 34 for retracting the piston rod and hence raising the guard in the apparatus.

It should be understood that the foregoing functions only occur in the normal actuation process of the ram of the press brake if the fluidic sensors or valve means 42 positioned on the guard 30 remain under pressure. When any one or more of spring type whisker sensors or equivalents 44 and 46 provided on the valves 42 are deflected by vertical upward movement of the deflector bar 34, then these sensors actuate or change the air flow through a directional flow valve 136 and this in turn changes the air flow path through a sensor venturi 138. Such venturi 138 connects by line 140 to a three-way diaphragm amplifier 142 to change the position thereof. Such amplifier in turn connects to a control valve 144 in the system that connects to a quick exhaust member 146 to remove air pressure supply thereto. The member 146 is connected to the cylinder 86 for a quick exhaust of air therefrom. Hence, the sensors 44 and 46 when actuated, cause quick unload of the pressure on the cylinder 86 and thus unloads pressure supplied to the system and the valve 144 by the push button control valve 122. By unloading the pressure in this part of the system, the cylinder 86 permits the spring 92 to move the control linkage 50 and break up the straight line relationship between the links 80 and 82 so that the control arm 54 is rendered inoperative and the clutch 20 is not actuated or is released if previously actuated. By use of the quick exhaust member 146 in the air flow control circuit, the drive for the ram is interrupted before any full downward movement thereof occurs and thus the ram action is stopped before any harm can be done to a foreign object or a worker's arm or any other obstruction present in the path of movement of the ram.

For press brake operation, the control valve 122 must be depressed or pushed again to supply control pressure to the control valve 144 to return it to its position to supply air pressure to the exhaust member or valve 146 to energize the cylinder 86.

Any failure of air supply to the control system will release the exhaust member 146 and the pressure supply to the cylinder 86 to terminate drive of the press brake.

The valve 100 also actuates the guard control cylinders if the press brake recycles without movement of the treadle 28.

Distributor tube 150 has air pressure supplied thereto from one of the supply lines 120. Connections from a control panel P to the remotely positioned controls are indicated at C.

The various air supply and transmission tubes shown in FIG. 7 are omitted in the other figures of the drawings.

FIGS. 5 and 6 show that the link 62 from the foot treadle will pivot the plate 52 in one plane and the lower link 80 has a hinge 83a connecting to the section 83 for pivotal movement in a second plane perpendicular to said one plane.

The treadle 28 usually must be retained depressed to keep the press brake operative.

The press brake 10 is an example of a known press with all normal means thereon but other types of mechanically driven punch presses, or stamping or forging apparatus may have the controls in the invention provided thereon. It only requires replacing the usual drive actuation link with the novel link means 50 of the invention and the control valves and members shown and described to provide the press brake equivalent with the safety apparatus of the invention. Several sensors 44 are spaced along the lower edge of the guard 30. Such guard 30 has the protector bar movable attached thereto in any suitable manner.

While one complete embodiment of the invention has been disclosed herein, it will be appreciated that modification of this particular embodiment of the invention may be resorted to without departing from the scope of the invention.

The embodiment of the invention in which an exclusive property or privilege is claimed are defined as follows:

1. A press brake safety device comprising a press brake including a frame having a work positioning means thereon, a ram positioned on the frame for vertical reciprocation towards and away from engaging work on the work positioning means, a drive motor connectable to the ram by a clutch, pitman and eccentric means, and a foot treadle for controlling said clutch to actuate said ram for work engaging movement, the improvement comprising a guard for the ram positioned in front of the same and extending therebelow, air cylinders engaging ends of said guard to mount it on the frame and to move it vertically with but in advance of said ram to and from a position shielding said work positioning means, a lightweight protector bar vertically movably positioned on the lower end of said guard, linkage means connecting said foot treadle to said clutch means to engage the same on depression of said foot treadle, safety means connecting to said linkage means for rendering the same inoperative, and air operated control means connected to said protector bar to actuate said safety means upon movement of said protector bar in relative to said guard.

2. A press brake safety device as in claim 1 where said linkage means comprises a pair of end to end pivotally connected aligned members, and said safety means includes an axially movable rod operatively connecting to said members at the pivotal connection therebetween to displace the same and prevent clutch engagement when said air operated means are actuated.

3. A press brake safety device as in claim 2 where a control valve is operably connected to said linkage means and actuated of said treadle means, and pressure supply means connect to said control valve and to said cylinders to lower said guard when said control valve is actuated.

4. A press brake as in claim 3 where a cam operated override valve means operably connects between said pitman and eccentric to be actuated by drive of the press brake pitman and eccentric starting said ram downwardly, said last named valve means connecting to said pressure supply means to energize the same should said control valve means fail to function.

5. A press brake safety device as in claim 1 where controls operably connect to said cylinders to actuate the same for downward movement of said guard upon drive actuation of said ram, and other means connect to said cylinders to raise said guard upon predetermined movement of said ram.

6. A press brake safety device as in claim 1 where said safety means comprise an air cylinder and spring means that are operably connected to said linkage means, said linkage means having operable and inoperably positions, said air cylinder being pressurized to retain said linkage means operable, and a rapid exhaust means connects to said last named air cylinder to exhaust the same when said protector bar signals its movement to said air operated control means and make said linkage means inoperative for connecting said foot treadle to said clutch means.

7. A press brake safety device as in claim 2 where one of said pivotally connected members includes a hinge means therein adapted for movement in one plane, and said linkage means includes a pivotal device actuated by said foot treadle and movable in a second plane perpendicular to said one plane.

* * * * *

UNITED STATES PATENT OFFICE
CERTIFICATE OF CORRECTION

Patent No. 4,036,343                Dated July 19, 1977

Inventor(s) John McPhee

It is certified that error appears in the above-identified patent and that said Letters Patent are hereby corrected as shown below:

```
Column 1, line 24, change "invenition" to -- invention --.
Column 2, line 52, change "treadly" to -- treadle --.
Column 2, line 55, change "treadly" to -- treadle --.
Column 3, line 11, change "pesent" to -- present --.
Column 3, line 26, change "cylindres" to -- cylinders --.
Column 3, line 47, change "treadly" to -- treadle --.
Column 3, line 49, change "treadly" to -- treadle --.
Column 3, line 55, change "conventinally" to -- conventionally --.
Column 4, line 30, change "is" to -- as --.
Column 6, line 33, change "movable" to -- movably --.
Column 8, Claim 6, line 6, change "inoperably" to -- inoperable --.
```

Signed and Sealed this

Twenty-fifth Day of October 1977

[SEAL]

Attest:

RUTH C. MASON          LUTRELLE F. PARKER
*Attesting Officer*      *Acting Commissioner of Patents and Trademarks*